United States Patent
Ma et al.

(10) Patent No.: US 11,442,747 B2
(45) Date of Patent: Sep. 13, 2022

(54) METHOD FOR ESTABLISHING APPLICATIONS-TO-BE PRELOADED PREDICTION MODEL BASED ON PREORDER USAGE SEQUENCE OF FOREGROUND APPLICATION, STORAGE MEDIUM, AND TERMINAL

(71) Applicant: Guangdong Oppo Mobile Telecommunications Corp., Ltd., Guangdong (CN)

(72) Inventors: Meirong Ma, Guangdong (CN); Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 687 days.

(21) Appl. No.: 16/407,602

(22) Filed: May 9, 2019

(65) Prior Publication Data
US 2019/0347113 A1 Nov. 14, 2019

(30) Foreign Application Priority Data
May 10, 2018 (CN) .................. CN201810443981.5

(51) Int. Cl.
*G06F 9/445* (2018.01)
*G06N 20/00* (2019.01)
(Continued)

(52) U.S. Cl.
CPC ........ *G06F 9/44578* (2013.01); *G06F 9/4818* (2013.01); *G06F 9/5038* (2013.01); *G06N 20/00* (2019.01)

(58) Field of Classification Search
CPC .... G06F 9/445; G06F 9/44578; G06F 9/4818; G06F 9/5038; G06F 9/44521; G06N 3/08
See application file for complete search history.

(56) References Cited

U.S. PATENT DOCUMENTS

| 7,747,749 B1 | 6/2010 | Erikson et al. |
| 8,812,658 B1 | 8/2014 | Teeraparpwong et al. |

(Continued)

FOREIGN PATENT DOCUMENTS

| CN | 102446096 A | 5/2012 |
| CN | 102541602 A | 7/2012 |

(Continued)

OTHER PUBLICATIONS

English Translation of First office action issued in corresponding Chinese application No. 201810443981.5 dated Feb. 10, 2020.
(Continued)

*Primary Examiner* — Raymond N Phan
(74) *Attorney, Agent, or Firm* — Young Basile Hanlon & MacFarlane, P.C.

(57) ABSTRACT

A method for establishing an application prediction model, a storage medium, and a terminal are provided. The method includes the following. In response to an operation switching an application previously running in the foreground to a first application currently running, a first preorder usage sequence of the first application currently running is collected as sample usage information. Applications launched within a time-window are monitored, and a preset number of applications launched first in the applications launched within the time-window are set as sample labels for the sample usage information. A predetermined machine learning model is trained based on the sample usage information and the sample labels for the sample usage information, to obtain the application prediction model.

14 Claims, 7 Drawing Sheets

(51) Int. Cl.
  *G06F 9/48* (2006.01)
  *G06F 9/50* (2006.01)

(56) References Cited

U.S. PATENT DOCUMENTS

| | | |
|---|---|---|
| 9,448,708 B1 | 9/2016 | Bennett et al. |
| 9,513,888 B1 | 12/2016 | Fultz et al. |
| 9,557,889 B2 | 1/2017 | Raleigh et al. |
| 9,565,233 B1 | 2/2017 | Ozuysal et al. |
| 9,588,897 B2 | 3/2017 | Clausen et al. |
| 10,261,938 B1 | 4/2019 | Jenkins et al. |
| 10,310,872 B2 * | 6/2019 | Tsirkin ............ G06F 9/45558 |
| 10,459,887 B1 | 10/2019 | Dvortsov et al. |
| 2003/0220984 A1 | 11/2003 | Jones et al. |
| 2004/0030882 A1 | 2/2004 | Forman |
| 2004/0153445 A1 | 8/2004 | Horvitz et al. |
| 2005/0160352 A1 | 7/2005 | Chung et al. |
| 2005/0204198 A1 | 9/2005 | Pagan |
| 2007/0016480 A1 | 1/2007 | Lee |
| 2008/0005736 A1 | 1/2008 | Apacible et al. |
| 2009/0144396 A1 | 6/2009 | Walton |
| 2010/0082321 A1 * | 4/2010 | Cherkasova ........ G06F 11/3447 703/22 |
| 2011/0090234 A1 | 4/2011 | Bolcsfoldi et al. |
| 2011/0292060 A1 | 12/2011 | Chambers et al. |
| 2011/0295830 A1 | 12/2011 | Swahn |
| 2012/0023226 A1 | 1/2012 | Petersen et al. |
| 2012/0105363 A1 | 5/2012 | Sirpal et al. |
| 2012/0117495 A1 | 5/2012 | Sirpal et al. |
| 2012/0167122 A1 | 6/2012 | Koskimies |
| 2012/0324481 A1 | 12/2012 | Kia et al. |
| 2013/0076597 A1 | 3/2013 | Becze |
| 2013/0120294 A1 | 5/2013 | Sun et al. |
| 2013/0173513 A1 | 7/2013 | Chu et al. |
| 2014/0075377 A1 | 3/2014 | Kang et al. |
| 2014/0173354 A1 | 6/2014 | Stanquist et al. |
| 2014/0184471 A1 | 7/2014 | Martynov et al. |
| 2014/0372356 A1 * | 12/2014 | Bilal ................ G06F 9/44578 706/46 |
| 2014/0373032 A1 | 12/2014 | Merry et al. |
| 2015/0026415 A1 | 1/2015 | Clausen et al. |
| 2015/0293701 A1 | 10/2015 | Kim et al. |
| 2015/0324137 A1 | 11/2015 | Wu et al. |
| 2015/0355795 A1 | 12/2015 | Falkenburg et al. |
| 2016/0117716 A1 | 4/2016 | Lin et al. |
| 2016/0132344 A1 | 5/2016 | Funk et al. |
| 2016/0162148 A1 | 6/2016 | Murphy et al. |
| 2016/0189049 A1 | 6/2016 | Silvestri et al. |
| 2016/0203021 A1 | 7/2016 | Pike et al. |
| 2016/0246484 A1 | 8/2016 | Kim et al. |
| 2016/0357572 A1 | 12/2016 | Myrick et al. |
| 2016/0360336 A1 | 12/2016 | Gross et al. |
| 2016/0364272 A1 | 12/2016 | Hou et al. |
| 2017/0031690 A1 | 2/2017 | Ren |
| 2017/0046171 A1 | 2/2017 | Jung et al. |
| 2017/0185250 A1 | 6/2017 | Cho et al. |
| 2017/0195451 A1 | 7/2017 | Backholm |
| 2017/0344783 A1 | 11/2017 | Zhang et al. |
| 2018/0089105 A1 | 3/2018 | Bain et al. |
| 2018/0097905 A1 | 4/2018 | Todasco et al. |
| 2018/0113773 A1 * | 4/2018 | Krishnan ............ G06F 11/008 |
| 2018/0217853 A1 | 8/2018 | Li et al. |
| 2018/0246635 A1 | 8/2018 | Baer et al. |
| 2018/0293087 A1 | 10/2018 | Lee et al. |
| 2019/0018565 A1 | 1/2019 | Lee et al. |
| 2019/0065240 A1 | 2/2019 | Kong et al. |
| 2019/0138904 A1 * | 5/2019 | Millius ............... G06N 3/0445 |
| 2019/0303176 A1 | 10/2019 | John |
| 2019/0342298 A1 | 11/2019 | Chen et al. |
| 2019/0361581 A1 | 11/2019 | Wang et al. |
| 2020/0401418 A1 | 12/2020 | Regev et al. |

FOREIGN PATENT DOCUMENTS

| | | |
|---|---|---|
| CN | 102819436 A | 12/2012 |
| CN | 102929532 A | 2/2013 |
| CN | 103092687 A | 5/2013 |
| CN | 103106000 A | 5/2013 |
| CN | 103246529 A | 8/2013 |
| CN | 103376974 A | 10/2013 |
| CN | 103412757 A | 11/2013 |
| CN | 103581754 A | 2/2014 |
| CN | 103593479 A | 2/2014 |
| CN | 103631612 A | 3/2014 |
| CN | 103677922 A | 3/2014 |
| CN | 104092821 A | 10/2014 |
| CN | 104298554 A | 1/2015 |
| CN | 104657183 A | 5/2015 |
| CN | 104809174 A | 7/2015 |
| CN | 104850799 A | 8/2015 |
| CN | 104951340 A | 9/2015 |
| CN | 105426214 A | 3/2016 |
| CN | 105431822 A | 3/2016 |
| CN | 105657522 A | 6/2016 |
| CN | 105682037 A | 6/2016 |
| CN | 105786839 A | 7/2016 |
| CN | 105824657 A | 8/2016 |
| CN | 105912215 A | 8/2016 |
| CN | 105912227 A | 8/2016 |
| CN | 105939416 A | 9/2016 |
| CN | 105955765 A | 9/2016 |
| CN | 106055369 A | 10/2016 |
| CN | 106056010 A | 10/2016 |
| CN | 106066805 A | 11/2016 |
| CN | 106201241 A | 12/2016 |
| CN | 106250988 A | 12/2016 |
| CN | 106325913 A | 1/2017 |
| CN | 106406966 A | 2/2017 |
| CN | 106569894 A | 4/2017 |
| CN | 106648747 A | 5/2017 |
| CN | 106685851 A | 5/2017 |
| CN | 106775820 A | 5/2017 |
| CN | 106778248 A | 5/2017 |
| CN | 106874091 A | 6/2017 |
| CN | 106874095 A | 6/2017 |
| CN | 106919313 A | 7/2017 |
| CN | 106941672 A | 7/2017 |
| CN | 106959879 A | 7/2017 |
| CN | 107229397 A | 10/2017 |
| CN | 107249074 A | 10/2017 |
| CN | 107273011 A | 10/2017 |
| CN | 107368361 A | 11/2017 |
| CN | 107508961 A | 12/2017 |
| CN | 107562495 A | 1/2018 |
| CN | 107678799 A | 2/2018 |
| CN | 107678803 A | 2/2018 |
| CN | 107678823 A | 2/2018 |
| CN | 107728874 A | 2/2018 |
| CN | 107729133 A | 2/2018 |
| CN | 107748685 A | 3/2018 |
| CN | 107748686 A | 3/2018 |
| CN | 107766201 A | 3/2018 |
| CN | 107783801 A | 3/2018 |
| CN | 107833073 A | 3/2018 |
| CN | 107872523 A | 4/2018 |
| CN | 107885591 A | 4/2018 |
| CN | 107943650 A | 4/2018 |
| CN | 107944259 A | 4/2018 |
| CN | 108076224 A | 5/2018 |
| CN | 108572965 A | 9/2018 |
| CN | 108595224 A | 9/2018 |
| CN | 108595227 A | 9/2018 |
| CN | 108595231 A | 9/2018 |
| CN | 108614722 A | 10/2018 |
| CN | 108647052 A | 10/2018 |
| CN | 108647056 A | 10/2018 |
| CN | 108710513 A | 10/2018 |
| CN | 108762831 A | 11/2018 |
| CN | 108762843 A | 11/2018 |
| CN | 108804157 A | 11/2018 |
| CN | 108829456 A | 11/2018 |

(56) References Cited

FOREIGN PATENT DOCUMENTS

| CN | 108829457 A | 11/2018 |
|---|---|---|
| CN | 108920156 A | 11/2018 |
| EP | 1242880 A2 | 9/2002 |
| EP | 3486769 A1 | 5/2019 |
| WO | 3054696 A1 | 7/2003 |
| WO | 2013073908 A1 | 5/2013 |
| WO | 2015169188 A1 | 11/2015 |
| WO | 2017057912 A1 | 4/2017 |
| WO | 2018055506 A1 | 3/2018 |
| WO | 2018161812 A1 | 9/2018 |
| WO | 2019171237 A1 | 9/2019 |

OTHER PUBLICATIONS

"Using Neural Network to Predict Time Series", by lanxin0802, web page from CSDN, dated Mar. 24, 2017. https://blogcsdn.net/lanxin0802/article/details/65628667.

Third office action with English Translation issued in corresponding Chinese application No. 201810443981.5 dated Nov. 16, 2020.

Extended European Search Report for EP Application 18212560.9 dated May 23, 2019. (9 pages).

China First Office Action with English Translation for CN Application 201711340000.6 dated Nov. 29, 2019. (11 pages).

China Office Action with English Translation for CN Application 201711340000.6 dated Mar. 25, 2020. (20 pages).

China Office Action with English Translation for CN Application 201711340000.6 dated Jul. 7, 2020. (8 pages).

China Decision to Refuse with English Translation for CN Application 201711340000.6 dated Nov. 4, 2020. (14 pages).

India Examination Report for IN Application 201814047359 dated Mar. 22, 2021. (7 pages).

U.S. Non-Final Office Action U.S. Appl. No. 16/220,601 dated Jul. 8, 2020. (38 pages).

U.S. Final Office Action for U.S. Appl. No. 16/220,601 dated Jan. 19, 2021. (26 pages).

International Search Report for International Application PCT/CN2018/121309 dated Mar. 14, 2019. (11 pages).

Zhejiang University, Behavioral Pattern Mining for Mobile Applications. (11 pages).

China First Office Action with English Translation for CN Application 201810530136.1 dated Mar. 20, 2020. (29 pages).

China Second Office Action with English Translation for CN Application 201810530136.1 dated Sep. 30, 2020. (21 pages).

China Third Office Action with English Translation for CN Application 201810530136.1 dated Apr. 2, 2021. (21 pages).

Extended European Search Report for EP Application 19169146.8 dated Nov. 12, 2019. (8 pages).

India Office Action for IN Application 201914014288 dated Mar. 22, 2021. (7 pages).

International Search Report for International Application PCT/CN2019/082303 dated Jul. 12, 2019. (10 pages).

China First Office Action with English Translation for CN Application 201810532749.9 dated Mar. 2, 2020. (15 pages).

Tingxin Yan et al., Fast App launching for Mobile Devices Using Predictive User Context, MobiSys' 12,Jun. 25-29, 2012. (14 pages).

Extended European Search Report for EP Application 19162115.0 dated Sep. 27, 2019. (10 pages).

International Search Report for International Application PCT/CN2019/076755 dated May 10, 2019. (10 pages).

China First Office Action with English Translation for CN Application 201810532722.X dated Sep. 23, 2019. (11 pages).

China Notice of Allowance with English Translation for CN Application 201810532722.X dated Mar. 25, 2020. (12 pages).

Ricardo Baeza-Yates et al., Predicting the Next App That You Are Going to Use, WSDM'15, Feb. 2-6, 2015. (11 pages).

Extended European Search Report with EP Application 19168847.2 dated Oct. 23, 2019. (8 pages).

India Examination Report for IN Application 201914019649 dated Nov. 27, 2020. (6 pages).

U.S. Non-Final Office Action for U.S. Appl. No. 16/290,190 dated Mar. 5, 2020. (37 pages).

International Search Report for International Application PCT/CN2019/085900 dated Aug. 1, 2019. (10 pages).

China First Office Action with English Translation CN Application 201810443194.0 dated Dec. 11, 2019. (15 pages).

China Office Action with English Translation for CN Application 201810443194.0 dated Mar. 25, 2020. (18 pages).

China Decision to Refuse with English Translation for CN Application 201810443194.0 dated Jul. 9, 2020. (12 pages).

Hong Cao et al., Mining Smartphone data for app usage prediction and recommendations: A Survey, Pervasive and Mobile Computing, Jan. 2017. (22 pages).

Extended European Search Report for EP Application 19171005.2 dated Oct. 10, 2019. (10 pages).

European Examination Report for EP Application 19171005.2 dated Aug. 28, 2020. (5 pages).

European Examination Report for EP Application 19171005.2 dated Mar. 24, 2021. (6 pages).

India Examination Report for IN Application 201914016637 dated Feb. 8, 2021. (7 pages).

International Search Report for International Application PCT/CN2019/083230 dated Jun. 17, 2019. (11 pages).

China First Office Action with English Translation for CN Application 201810442588.4 dated Mar. 29, 2019. (25 pages).

China Second Office Action with English Translation for CN Application 201810442588.4 dated Oct. 15, 2019. (18 pages).

China Third Office Action with English Translation for CN Application 201810442588.4 dated May 18, 2020. (15 pages).

Extended European Search Report for EP Application 19171253.8 dated Sep. 30, 2019. (7 pages).

India First Examination Report for IN Application 201914017025 dated Jan. 27, 2021. (7 pages).

US Third Party Submission for U.S. Appl. No. 16/397,521 mailed May 11, 2020. (15 pages).

U.S. Non-Final Office Action for U.S. Appl. No. 16/397,521 dated Feb. 16, 2021. (36 pages).

International Search Report for International Application PCT/CN2019/083256 dated Jun. 14, 2019. (11 pages).

China First Office Action with English translation for CN Application 201810463427.3 dated Feb. 3, 2020. (13 pages).

Abhinav Parate et al., Practical Prediction and Prefetch for Faster Access to Applications on Mobile phones, UbiComp'13, Sep. 8-12, 2013. (11 pages).

Extended European Search Report for EP Application 19173437.5 dated Oct. 14, 2019. (8 pages).

Examination report issued in corresponding European application No. 19173437.5 dated Nov. 2, 2020.

International Search Report for International Application PCT/CN2019/084999 dated Jul. 25, 2019. (10 pages).

China First Office Action with English Translation for CN Application 201810578120.8 dated Nov. 30, 2020. (19 pages).

Extended European Search Report for EP Application 19176708.6 dated Nov. 5, 2019. (8 pages).

European Examination Report for EP Application 19176708.6 dated Jun. 23, 2020. (5 pages).

India Examination Report for IN Application 201914022209 dated Sep. 30, 2020. (6 pages).

International Search Report for International Application PCT/CN2019/089685 dated Aug. 28, 2019. (10 pages).

China First Office Action with English Translation for CN Application 201810400917.9 dated Aug. 28, 2019. (29 pages).

China Second Office Action with English Translation for CN Application 201810400917.9 dated Nov. 7, 2019. (28 pages).

China Third Office Action with English Translation for CN Application 201810400917.9 dated Jan. 17, 2020. (32 pages).

China Decision to Refuse with English Translation for CN Application 201810400917.9 dated Apr. 20, 2020. (47 pages).

International Search Report for International Application PCT/CN2019/084218 dated Jul. 31, 2019. (17 pages).

Extended European Search Report for EP Application 19793314.6 dated Apr. 20, 2021. (9 pages).

(56) References Cited

OTHER PUBLICATIONS

China First Office Action with English Translation for CN Application 201810531573.5 dated Oct. 29, 2020. (18 pages).
Partial European Search Report for EP Application 19173778.2 dated Oct. 11, 2019. (15 pages).
Android Developers, Multi-Window Support mailed May 19, 2018. (13 pages).
Extended European Search Report for EP Application 19173778.2 dated Jan. 29, 2020. (14 pages).
India Examination Report for IN Application 201914018510 dated Jan. 27, 2021. (5 pages).
U.S. Non-Final Office Action for U.S. Appl. No. 16/394,768 dated Feb. 19, 2021. (41 pages).
International Search Report for International Application PCT/CN2019/083479 dated Jun. 27, 2019. (10 pages).
India Examination Report for IN Application 201914018092 dated Feb. 8, 2021. (5 pages).
Notice of Allowance for U.S. Appl. No. 16/397,521 dated Apr. 15, 2021. (12 pages).
Android Developer, Handle Activity State Changes mailed Nov. 7-8, 2018. (6 pages).
Android Developer, Understandi the Activity Lifecycle mailed May 8, 2018. (29 pages).
Second office action and English Translation issued in corresponding Chinese application No. 201810443981.5 dated Aug. 3, 2020.
Extended European search report issued in corresponding European application No. 19173310.4 dated Oct. 11, 2019.
International search report issued in corresponding international application No. PCT/CN2019/085347 dated Aug. 12, 2019.

\* cited by examiner

METHOD FOR ESTABLISHING APPLICATIONS-TO-BE PRELOADED PREDICTION MODEL BASED ON PREORDER USAGE SEQUENCE OF FOREGROUND APPLICATION, STORAGE MEDIUM, AND TERMINAL

CROSS-REFERENCE TO RELATED APPLICATIONS

This application claims priority to Chinese Patent Application No. 201810443981.5, filed on May 10, 2018, the disclosure of which is hereby incorporated by reference in its entirety.

TECHNICAL FIELD

The present disclosure relates to the technical field of machine learning, and more particularly to a method for establishing an application prediction model, a storage medium, and a terminal.

BACKGROUND

At present, with rapid development of technologies of smart terminals, smart devices such as smart phones, tablet computers, smart televisions, and the like have become indispensable electronic devices in people's life.

In the smart terminal, a wide variety of applications are installed. An application is generally loaded only when a user launches the application by default. However, storage space occupied by the applications is increasingly larger, and time period of loading is increasingly longer, which wastes time of the user. In order to make the applications run more smoothly, some smart terminals will prepare in advance resources for loading of some applications, that is, preload some applications in advance.

However, it is impossible to preload applications at random. The reason is that if too many resources have been preloaded, large storage space will be occupied, and power consumption will increase, which will affect seriously smoothness of the terminal in use. Therefore, it is of vital importance to optimize mechanisms for preloading and reduce power consumption of the terminal.

SUMMARY

According to a first aspect of the present disclosure, a method for establishing an application prediction model is provided. The method includes the following. In response to an operation switching an application previously running in the foreground to a first application currently running, a first preorder usage sequence of the first application is collected (sampled) as sample usage information. Applications launched within a time-window from a starting point of collecting the sample usage information and having a preset length are monitored, and a preset number of applications launched first in the applications launched within the time-window are set as sample labels for the sample usage information. A predetermined machine learning model is trained based on the sample usage information and the sample labels for the sample usage information, to obtain the application prediction model (in other words, model for application prediction).

According to a second aspect of the present disclosure, a non-transitory computer-readable storage medium is provided. The non-transitory computer-readable storage medium is configured to store computer programs which, when executed by a processor, are operable with the processor to execute the method for establishing an application prediction model described in the first aspect.

According to a third aspect of the present disclosure, a terminal is provided. The terminal includes at least one processor and a computer readable storage coupled to the at least one processor and storing at least one computer executable instruction thereon which, when executed by the at least one processor, cause the at least one processor to execute the method for establishing an application prediction model described in the first aspect when executed by the processor.

DETAILED DESCRIPTION

Technical solutions of the present disclosure will be further described below through implementations with reference to the accompanying drawings. It will be appreciated that the implementations described herein are merely for the purpose of explanation rather than restriction of the disclosure. In addition, for the convenience of description, only some structures, rather than all structures related to the present disclosure, are illustrated in the accompanying drawings.

Before discussing the exemplary implementations in more detail, it should be noted that some exemplary implementations are described as processes or methods illustrated in a flowchart. In the flowchart, although each step is depicted as being processed sequentially, some of these steps can be performed in parallel, concurrently, or simultaneously. In addition, the order of the steps can be rearranged. The process of one step can be terminated when a corresponding operation is completed, but the implementations can also have additional steps that are not illustrated in the accompanying drawings. The process can correspond to a method, a function, a procedure, a subroutine, a subprogram, and the like.

In a terminal device, preloading of applications is a method which is commonly used and can improve effectively user experience. The applications can run more smoothly by preparing resources for loading of some applications in advance.

In the related art, the applications are preloaded mainly based on statistical methods. As an implementation, only a few applications are most frequently used by a user and thus are all preloaded. As an implementation, the applications are graded and ranked according to the using habit of the user, and top-ranked applications are preloaded. However, since association information between applications, time information, status information of a terminal, and the like are ignored, the above methods are poor in accuracy of prediction of applications preloaded and excessive resources need to be preloaded, whereas only one application will be actually launched by the user at the next time point, which affects user experience. Therefore, it is of great significance to predict accurately which application to be launched at the next time point.

Figure 1:
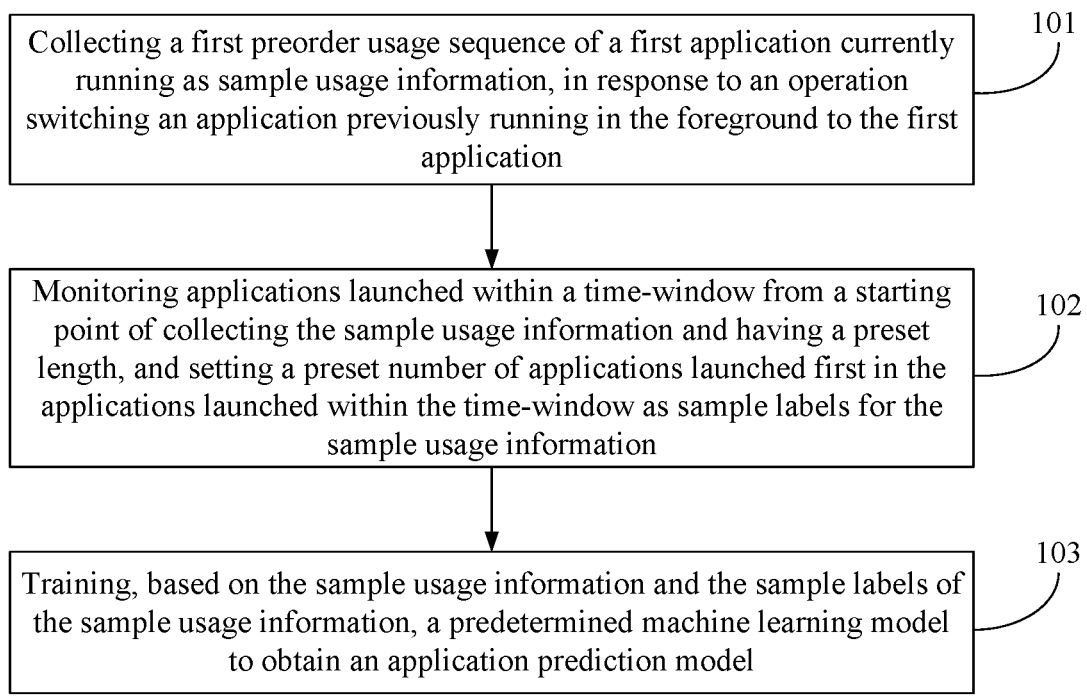
FIG. 1 is a flowchart illustrating a method for establishing an application prediction model according to an implementation of the present disclosure.

FIG. 1 is a flowchart illustrating a method for establishing an application prediction model according to an implementation of the present disclosure. The method may be performed by an apparatus for establishing an application prediction model. The apparatus may be implemented in software and/or hardware and may be integrated into a terminal in general. As illustrated in FIG. 1, the method includes the following. Specifically, operations corresponding to FIG. 1 illustrate how to establish an application prediction model.

At 101, a first preorder usage sequence of a first application currently running is collected as sample usage information, in response to an operation switching an application previously running in the foreground to the first application.

In implementations of the disclosure, the operation switching the application previously running in the foreground to the first application is configured to switch the application previously running in the foreground to the first application currently running.

In implementations of the disclosure, the first preorder usage sequence of the first application currently running is collected. The first preorder usage sequence can be comprehended as a correlation sequence of usage timing of applications associated with the first application currently running within a preset time period backtracked from the current time point. As an implementation, in response to detecting switching from Application B to Application A, it indicates that the switching operation on the application previously running in the foreground is detected. In this case, the first application currently running is Application A, and the application running at the previous time point is Application B. As such, the first preorder usage sequence of the first application currently running (Application A) is "Application B-Application A". As another implementation, the first application currently running is Application C, the application running at the previous time point is Application D, and the application running at the time point prior to the foregoing previous time point is Application E. Application E is switched to Application D, and Application D is then switched to Application C. As such, the first preorder usage sequence of Application C currently running can be expressed as "Application E-Application D-Application C". The number of applications included in the first preorder usage sequence of the first application is not limited herein.

Within the preset time period, each time the switching operation on the application previously running in the foreground is detected, the first preorder usage sequence of the first application currently running is collected and set as a piece of sample usage information. As an implementation, the preset time period is one month, and then the first preorder usage sequence of the first application currently running is collected in response to the switching operation on the application previously running in the foreground within one month. As an implementation, five thousand times of switching operations on the application previously running in the foreground are detected within one month. As such, five thousand first preorder usage sequences are accordingly collected (sampled) in total, that is, five thousand pieces of sample usage information. The number of applications included in each of the five thousand first preorder usage sequences can be the same or different.

At 102, applications launched within a time-window with a preset length from a time point at which the sample usage information is collected as a start time point are monitored, and a preset number of applications launched first in the applications launched within the time-window are set as sample labels for the sample usage information.

In other word, the time-window is from a starting point of collecting the sample usage information and has a preset length.

In the implementations of the disclosure, when target applications to be launched are predicted according to the application prediction model established, it is usually desired that the application prediction model output launching probabilities of a preset number of candidate applications and determine target applications to be loaded in the candidate applications according to the launching probabilities. Therefore, when the application prediction model is generated, the applications launched within the time-window with the preset length from the time point at which the sample usage information is collected as the start time point are monitored, and the preset number of applications launched first in the applications launched within the time-window are set as the sample labels for the sample usage information. As an implementation, when the number of the applications launched within the time-window is greater than the preset number, the preset number of applications launched first are set as the sample labels for the sample usage information; when the number of the applications launched within the time-window is smaller than the preset number, all the applications launched within the time-window are set as the sample labels for the sample usage information.

As an implementation, a piece of sample usage information (that is, the first preorder usage sequence) is "Application A-Application B-Application C", and the time point at which the piece of sample usage information is sampled is 8:00. It can be understood that, switching from Application B to Application C is detected at 8:00, and accordingly the first preorder usage sequence of Application C running at 8:00 is sampled as "Application A-Application B-Application C" and set as a piece of sample usage information. The time-window with the preset length is set to five minutes, and accordingly the applications launched within the time-window 8:00-8:05 are monitored. As an implementation, the applications launched within the time-window 8:00-8:05 are sequentially "Application D, Application F, Application B, Application G, and Application A". If the preset number is set to four, Application D, Application F, Application B, and Application G will be set as the sample labels for the first preorder usage information "Application A-Application B-Application C". If the preset number is six, Application D, Application F, Application B, Application G, and Application A will all be set as the sample labels for the first preorder usage information "Application A-Application B-Application C".

The preset number of applications launched first can be ordered at random to label the sample usage information. As another implementation, a launching sequence of the preset number of applications launched first can be set as the sample label for the sample usage information, that is, label the sample usage information according to the launching sequence of the preset number of applications launched first.

As an implementation, the launching sequence of the preset number of applications launched first in the applications launched within the time-window is set as the sample label for the sample usage information, which can label the sample usage information according to the launching sequence of the preset number of applications launched first, thereby improving effectively accuracy of establishing the application prediction model.

As an implementation, the sample usage information with sample labels includes the first preorder usage sequence and the preset number of applications launched first in the applications launched within the time-window which correspond to the first preorder usage sequence. As an implementation, the first preorder usage sequence is "Application A-Application B-Application C", the launching sequence of the preset number of applications launched first in the applications launched within the time-window which correspond to the first preorder usage sequence is "Application D-Application F-Application B-Application G", and accordingly the sample usage information with sample labels can be expressed as (Application A, Application B, Application C→Application D, Application F, Application B, Application G), where applications before the arrow (→) are the first preorder usage sequence, and applications after the arrow are the sample labels for the first preorder usage sequence.

At 103, a predetermined machine learning model is trained based on the sample usage information and the sample labels for the sample usage information to obtain the application prediction model.

In other words, the application prediction model is obtained by training a predetermined machine learning model based on the sample usage information and the sample labels for the sample usage information.

In the implementations of the disclosure, the predetermined machine learning model is trained based on the sample usage information and the sample labels for the sample usage information acquired, to generate the application prediction model. The predetermined machine learning model can include a recurrent neural network (RNN), a long short-term memory (LSTM) network, a gated recurrent unit (GRU), a simple recurrent unit (SRU), a hybrid network model, and the like.

As an implementation, in the process of training the predetermined machine learning model based on the sample usage information and the sample labels for the sample usage information to generate the application prediction model, the number of units in an input layer of the application prediction model is determined according to the number of applications included in the sample usage information (that is, the first preorder usage sequence), and the number of units in an output layer of the application prediction model is determined according to the number of sample labels for the sample usage information. That is to say, the number of units in the input layer of the application prediction model can be determined according to the number of applications included in the sample usage information, and the number of units in the output layer of the application prediction model can be determined according to the number of sample labels for the sample usage information. As an implementation, the sample usage information includes a usage sequence of two applications, and the sample labels for the sample usage information include four applications. As such, the number of units in the input layer of the application prediction model is two, and the number of units in the output layer is four. The data format of a sample for training during generation of the application prediction model can be expressed as $(APP_{t-n}, APP_{t-n+1}, \ldots, APP_{t-1}, APP_t \rightarrow APP_{t+1}, APP_{t+2}, APP_{t+3}, APP_{t+4})$, where $(APP_{t-n}, APP_{t-n+1}, \ldots, APP_{t-1}, APP_t)$ represents the first preorder usage sequence, and $(APP_{t+1}, APP_{t+2}, APP_{t+3}, APP_{t+4})$ represents the sample labels for the first preorder usage sequence.

According to the method for establishing an application prediction model provided herein, the first preorder usage sequence of the first application currently running is sampled as the sample usage information, in response to an operation switching an application previously running in the foreground to the first application. The applications launched within the time-window with the preset length from the time point at which the sample usage information is collected as the start time point are monitored, and the preset number of applications launched first in the applications launched within the time-window are set as the sample labels for the sample usage information. Then the predetermined machine learning model is trained based on the sample usage information and the sample labels for the sample usage information, to obtain the application prediction model. By adopting the above technical solution, the speed of generating the application prediction model can be increased, and accuracy of the application prediction model can be improved, thereby improving accuracy of prediction of applications to be launched.

In some implementations, setting the preset number of applications launched first in the applications launched within the time-window as the sample labels for the sample usage information includes the following. Probabilities are allocated to the preset number of applications launched first in the applications launched within the time-window according to intervals from the start time point to launching time points of the applications launched first. The preset number of applications and the probabilities of the preset number of applications are set as the sample labels for the sample usage information. In this way, during establishment of the application prediction model, not only can the applications launched within the time-window with the preset length from the time point at which the sample usage information is collected as the start time point be determined, but also the intervals from the start time point to the launching time points of the applications launched first can be determined, which can further improve accuracy of establishing the application prediction model.

As an implementation, the preset number is N, the N applications launched first in the applications launched within the time-window are respectively expressed as $X_1, X_2, \ldots, X_{N-1}, X_N$, the intervals from the start time point to the launching time points of Applications $X_1, X_2, X_{N-1}, X_N$ are respectively expressed as $T_1, T_2, \ldots, T_{N-1}, T_N$. As such, the probability allocated to Application $X_1$ is $P_{X1}=T_N/(T_1+T_2+\ldots+T_{N-1}+T_N)$, the probability allocated to Application $X_2$ is $PX_2=T_{N-1}/(T_1+T_2+\ldots+T_{N-1}+T_N)$, and so on, and the probability allocated to Application $X_N$ is $P_{XN}=T_1/(T_1+T_2+\ldots+T_{N-1}+T_N)$.

As an implementation, the sample usage information with sample labels includes the first preorder usage sequence, the preset number of applications, and the probabilities of the preset number of applications. As an implementation, the first preorder usage sequence is "Application F-Application H-Application G", and the preset number of applications launched first in the applications launched within the time window which correspond to the first preorder usage sequence are "Application A, Application B, Application C, and Application D". The interval from the time point at which the first preorder usage sequence is sampled (that is, the start time point) to the launching time point of Application A is a, the interval from the start time point to launching time point of Application B is b, the interval from the start time point to launching time point of Application C is c, and the interval from the start time point to launching time point of Application D is d. According to Intervals a, b, c, and d, the probability allocated to Application A is $P_A=d/(a+b+c+d)$, the probability allocated to Application B is $P_B=c/(a+b+c+d)$, the probability allocated to Application C is $P_C=b/(a+b+c+d)$, and the probability allocated to Application D is $P_D=a/(a+b+c+d)$. The shorter the interval corresponding to the application launched, that is, the earlier the application is launched, the greater the probability is. On the contrary, the longer the interval corresponding to the application launched, that is, the later the application is launched, the smaller the probability is. As such, the sample usage information with sample labels can be represented by (Application F, Application H, Application Application G→Application A, $P_A$, Application B, $P_B$, Application C, $P_C$, Application D, $P_D$), where applications before the arrow are the first preorder usage sequence, and applications and the probabilities after the arrow are the sample labels for the first preorder usage sequence.

In some implementations, the method further includes the following before training the predetermined machine learning model based on the sample usage information and the sample labels for the sample usage information. Status feature information of a terminal is acquired. The status feature information of the terminal corresponds to the time point at which the sample usage information is collected. The predetermined machine learning model can be trained based on the sample usage information and the sample labels for the sample usage information as follows. The predetermined machine learning model is trained based on the status feature information, the sample usage information, and the sample labels for the sample usage information. In this way, by taking the sample usage information of applications and the status feature information of the terminal corresponding to the sample usage information as source of samples for training the application prediction model, accuracy of training the application prediction model can be further improved, thereby improving accuracy of predicting applications to be loaded.

As an implementation, the status feature information includes at least one of: time information, a date category, an on/off status of a mobile data network, a connected/disconnected status of a wireless hotspot, identity information of a connected wireless hotspot, a duration for which a current application stays in the background, a time point at which the current application was last switched to the background, a plugging/unplugging status of an earphone jack, a charging status, power information of a battery, a display duration of a screen, and motion status and location information of the terminal.

The time information can be understood as a current time period corresponding to the terminal. For example, the time information may include morning rush hour, noon, evening rush hour, working time, and rest time. As another implementation, the time information can also be configured by equally dividing one day with 24 hours (0:00-24:00). For example, one day is divided into 6 time periods with each time period being 4 hours. The time information can be recorded in the form of a timestamp. The date category may include workdays and holidays and may also be recorded in the form of a timestamp. The on/off status of the mobile data network may include an on-status and an off-status of the mobile data network. When the mobile data network is in the on-status, the terminal can conduct a series of Internet operations such as web browsing and the like through the mobile data network; when the mobile data network is in the off-status, the terminal cannot conduct Internet operations such as web browsing and the like through the mobile data network. The connection status of the wireless hotspot may include a connected status and a disconnected status of the wireless hotspot. When the wireless hotspot is in the connected status, the status feature information may further include the identity information of the connected wireless hotspot. The identity information of the connected wireless hotspot may include a service set identifier (SSID) and a basic service set identity (BSSID). The duration for which the current application stays in the background can be understood as a duration from when the current application is switched to the background to when the current application is completely cleared from the background. The time point at which the current application was last switched to the background can be understood as the moment at which the current application was last switched to the background. According to the time point, a duration from the time point at which the current application was last switched to the background to a current moment can be determined. The plugging and unplugging status of the earphone jack can be understood as a connected status of an earphone and the terminal or a disconnected status of an earphone and the terminal. The charging status includes whether the terminal is in a charging mode, and may further include a charging mode type when the terminal is in the charging mode. The charging mode type can include a quick charging mode and a normal charging mode. In the quick charging mode, the terminal is charged by a quick charging power adapter (such as a power bank). In the normal charging mode, the terminal is charged by a normal power adapter (such as an original charger of the terminal). The power information of the battery can be understood as a current remaining power of the terminal. The display duration of the screen can be understood as a most recent screen-on duration. The motion status may include a current speed and/or an acceleration of the terminal. The location information can be understood as the specific location where the terminal is currently located, including provinces, cities, districts, counties, even specific to street names, building names, and the like.

In the implementations of the disclosure, in response to an operation switching an application previously running in the foreground to the first application, the first preorder usage sequence of the first application currently running is collected as sample usage information, and meanwhile the status feature information of the terminal corresponding to the time point at which the first preorder usage sequence is collected is acquired, that is, the status feature information of the terminal corresponding to the time point at which the sample usage information is collected is acquired. The application prediction model is generated, by training the predetermined machine learning model based on the status feature information, the sample usage information, and the sample labels for the sample usage information. In this way, the data format of a sample for training during generation of the application prediction model is $(APP_{t-n}, APP_{t-n+1}, \ldots, APP_{t-1}, APP_t,$ Feature 1, Feature 2, $\ldots$, Feature m$\rightarrow APP_{t+1}, APP_{t+2}, APP_{t+3}, APP_{t+4})$, where $(APP_{t-n}, APP_{t-n+1}, \ldots, APP_{t-}, APP_t)$ represents the first preorder usage sequence (that is, the first preorder usage sequence of $APP_t$ running at Time Point t), $(APP_{t+1}, APP_{t+2}, APP_{t+3}, APP_{t+4})$ represents the sample labels for the first preorder usage sequence, and (Feature 1, Feature 2, . . . , Feature m) represents the status feature information of the terminal corresponding to Time Point t (that is, the status feature information of the terminal corresponding to the time point at which the sample usage information is collected), where n is an integer greater than or equal to 1, and m is also an integer greater than or equal to 1.

In some implementations, the predetermined machine learning model is a hybrid network model, and the hybrid network model includes an RNN sub-model and a fully-connected network sub-model built based on a fully connected layer. An output layer of the RNN sub-model and an output layer of the fully-connected network sub-model build the hybrid network model based on a full connection relationship. Accordingly, training the predetermined machine learning model based on the status feature information, the sample usage information, and the sample labels for the sample usage information includes the following. The hybrid network model is trained, by inputting the sample usage information and the sample labels for the sample usage information to the RNN sub-model and inputting the status feature information to the fully-connected network sub-model. In this way, with aid of the hybrid network model built by the RNN sub-model and the fully-connected network sub-model, the sample usage information, the sample labels for the sample usage information, and the information on status of the terminal corresponding to the sample usage information are trained, which is possible to further improve accuracy of training the application prediction model, thereby further improving accuracy of prediction of applications to be launched.

Figure 2:
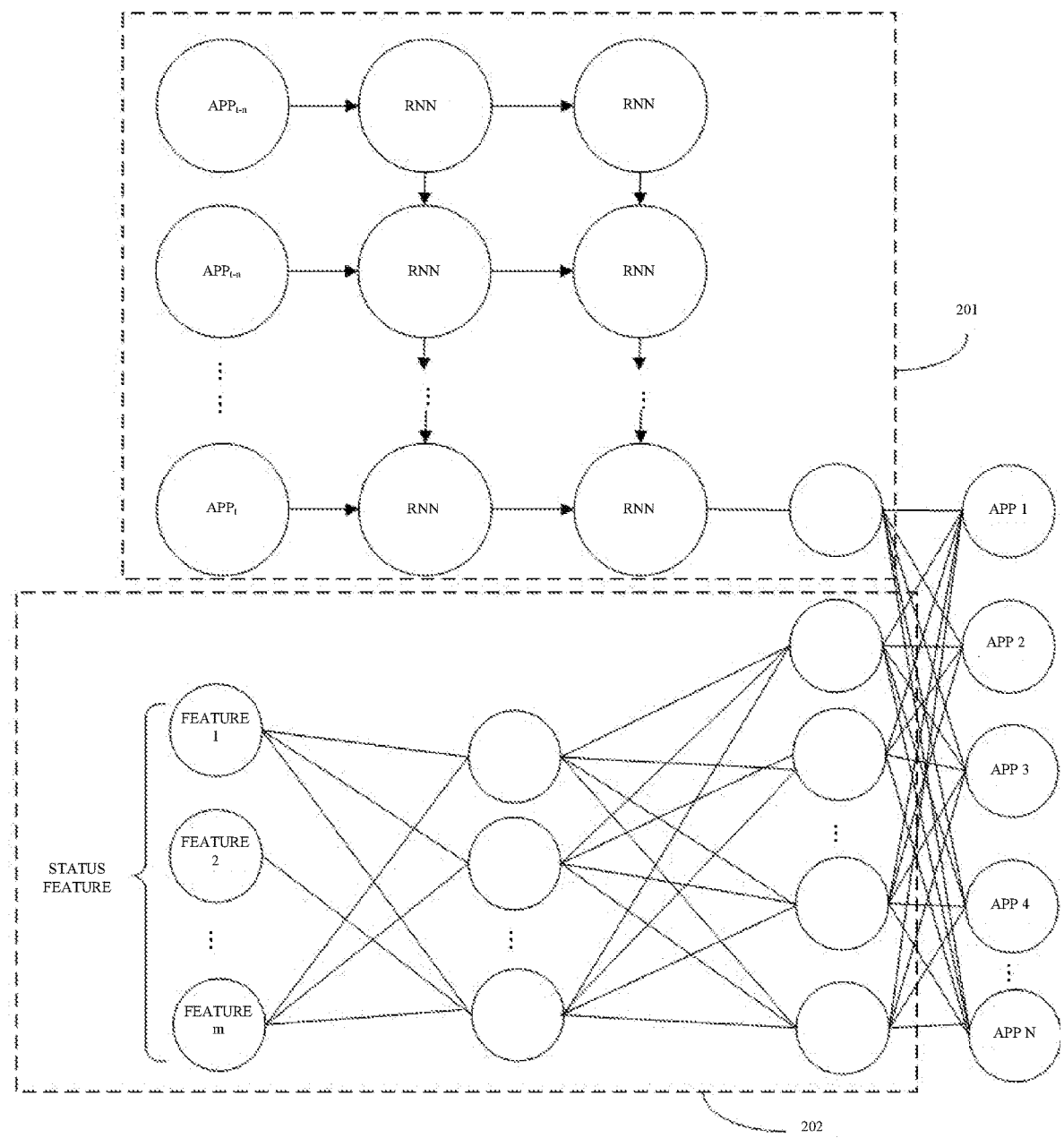
FIG. 2 is a block diagram illustrating a hybrid network model according to an implementation of the present disclosure.

As an implementation, the preset number is N, and accordingly the data format of a sample for training during generation of the application prediction model is ($APP_{t-n}$, $APP_{t-n+1}$, . . . , $APP_{t-1}$, $APP_t \rightarrow APP_{t+1}$, $APP_{t+2}$, $APP_{t+3}$, $APP_{t+4}$) ($APP_{t-n}$, $APP_{t-n+1}$, . . . , $APP_{t-}$, Feature 1, Feature 2, . . . , Feature m $\rightarrow APP_{t+1}$, $APP_{t+2}$, . . . , $APP_{t+N}$). Input the sample usage information and the sample labels for the sample usage information of data of each sample for training to the RNN sub-model in the hybrid network model, that is, input ($APP_{t+n}$, $APP_{t-n+1}$, . . . , $APP_{t-1}$, $APP_t \rightarrow APP_{t+1}$, $APP_{t+2}$, . . . , $APP_{t+N}$) to the RNN sub-model in the hybrid network model. The sample usage information represents a preorder usage sequence of an application, and the sample labels represent applications predicted to be launched, that is, the number of units in the output layer of the hybrid network model is equal to the number of the sample labels. At the same time, input the status feature information to the fully-connected network sub-model, to train the hybrid network model. FIG. 2 is a block diagram illustrating a hybrid network model according to an implementation of the present disclosure. As illustrated in FIG. 2, input ($APP_{t-n}$, $APP_{t-n+1}$, . . . , $APP_{t-1}$, $APP_t \rightarrow APP_{t+1}$, $APP_{t+2}$, . . . , $APP_{t+N}$) to the RNN sub-model 201 in the hybrid network model, that is, take ($APP_{t-n}$, $APP_{t-n+1}$, . . . , $APP_{t-1}$, $APP_t \rightarrow APP_{t+1}$, $APP_{t+2}$, . . . , $APP_{t+N}$) as data for training of the RNN sub-model 201, and meanwhile, input status feature information (Feature 1, Feature 2, . . . , Feature m) to the fully-connected network sub-model 202 in the hybrid network model. The application prediction model is generated by training the above sample data.

The application prediction model is configured to predict applications to be launched. In some implementations, the preset number is N, and the method further includes the following after obtaining the application prediction model. A second preorder usage sequence of a second application currently running of a terminal is acquired, in response to an event of application preloading prediction being triggered. The second preorder usage sequence is input to the application prediction model. N target applications to be launched are predicted according to an output result of the application prediction model. The N target applications are preloaded. As such, not only can technical problems such as preloading too many resources of applications, occupying too many resources, increasing power consumption, and even affecting smoothness of the terminal in use be solved, but also accuracy of predicting applications to be launched can be effectively improved, thereby further reducing power consumption of a system of the terminal and occupancy of storage and optimizing mechanisms for application preloading.

In the implementations of the disclosure, in response to the event of application preloading prediction being triggered, the second preorder usage sequence of the second application currently running of the terminal is acquired, to manage and control application preloading.

As an implementation, in response to detecting that a new application is launched, that is, in response to detecting the switching operation on the application previously running in the foreground, the event of application preloading prediction is triggered. As another implementation, in response to clicking actively, by the user, to enable (that is, switch on) permission for application preloading prediction, the event of application preloading prediction is triggered. The representation in which the event of application preloading prediction is triggered is not limited herein.

In the implementations of the disclosure, in response to the event of application preloading prediction being triggered, the second preorder usage sequence of the second application currently running in the terminal is acquired. The second preorder usage sequence can be comprehended as a correlation sequence of usage timing of applications associated with the second application currently running. As an implementation, the second application currently running is Application F, and the second preorder usage sequence is "Application H-Application F". The first application is an application running at the time point at which the sample usage information is collected during training of the application prediction model, whereas the second application is an application running at a time point of application preloading prediction when it is necessary to predict applications to be launched. The acquired second preorder usage sequence of the second application currently running is input to the application prediction model, and then the second preorder usage sequence is analyzed by the application prediction model, whereby the N target applications to be launched are obtained, and the N target applications are preloaded.

In some implementations, the N target applications are preloaded as follows. Application interfaces of the N target applications are preloaded based on a pre-established preloading active-window stack. The pre-established preloading active-window stack has boundary coordinates located beyond the coordinate range of a display screen. As such, application interfaces of applications which need to be preloaded can be preloaded based on a preloading active-window stack established outside the display screen. Such a manner of preloading can achieve preparation to a great extent before launching of applications and increase launching speed of target applications without interfering with displayed content of the application running in the foreground on the display screen.

In the implementations of the disclosure, an active-window can be understood as a separate interface that provides interaction and operation directly to the user. In different operating systems the interface can be referred to as different terms. To facilitate understanding, Android® operating system is set as an example for the following detailed description.

In Android® system, the active-window is named "Activity". The Activity is a component responsible for interacting with the user. The Activity provides a screen (which can be understood as a screen interface rather than a physical display screen) for the user to interact with to complete a certain task. In an Android® application, an Activity is usually a separate screen on which some controls can be displayed, and the separate screen can also monitor and handle events of the user. In the management of the Activity, there are two concepts: Task (task stack) and Stack (active-window stack). The Task corresponds to an application and is configured to store the Activity. One or more Activities can be stored in one Task, and these Activities follow a principle of "first in, last out; last in, first out". However, the Stack is configured to manage the Task. In general, one Stack manages Tasks to which each Activity to be displayed on one screen belongs, and one Stack can manage one or more Tasks. The Stack also follows basic management principles of stacks. The screen described herein is not necessarily a complete and separate display screen. Taking "two screens" as an example, the two screens can be just two areas that independently display their respective contents on a complete display screen. The "two screens" can also be two separate display screens when the terminal has two or even more than two separate display screens.

In Android® system, a multi-window mode is supported, and the multi-window mode can include a split-screen mode, a picture-in-picture mode, and a free mode (that is, FreeForm). In the multi-window mode, the Stack on which the application is located can have its own size and can include a top coordinate, a bottom coordinate, a left coordinate, and a right coordinate in a coordinate system with the top left corner of the terminal screen as the origin. For example, boundaries of a rectangle are generally described as (a, b, c, d) and can be represented by coordinates of the top left corner and coordinates of the bottom right corner of the rectangle. The coordinates of the top left corner are (a, b) and the coordinates of the bottom right corner are (c, d). Such a rectangular area then corresponds to the size of the Stack. An in-application layout in the Stack is based on the size of the Stack, that is, the application interface corresponding to the Activity is displayed within the bounds of the size.

In the multi-window mode, multiple applications can be allowed to be visible (to both the system and the user or to the system only). When an application is visible to both the system and the user, it means that the application is displayed on the display screen and can be seen by the user. When an application is visible to the system only, it means that the application is only visible to the operating system and however invisible to the user, and the application may be occluded by a foreground application, or displayed outside the display screen as implemented in the implementations of the present disclosure.

In the implementations of the present disclosure, the application interfaces of the target applications can be preloaded outside the display screen according to a multi-window mechanism of the operating system. With the multi-window mechanism, the size corresponding to the application can be set outside the display screen to achieve the purpose of invisibility to the user, whereby displayed content of the foreground application on the display screen will not be affected.

In general, in the multi-window mode, there can be multiple types of Stacks, such as Home Stack, APP Stack, other split-screen Stacks, and the like. The Home Stack represents a stack for display of desktop applications. The App Stack represents a stack for display of third-party applications. Content included in the above three types of Stacks can be displayed on the display screen and the above three types of Stacks are all named "application active-window stack" in the implementations of the disclosure. In the implementations of the disclosure, a preloading active-window stack (that is, preloading Stack) is added to represent a stack for display of a preloaded application. The boundary coordinates of the preloading Stack are set beyond the coordinate range of the display screen, and the application to-be preloaded can be displayed on the Stack. For Android® system, a new Stack dedicated to displaying preloaded applications can be established according to the multi-window mechanism of Android® system. In the implementations of the present disclosure, the reason for which the new Stack is established is that the new preloading Stack established can have its own size and visibility, thus achieving the purpose of preloading outside the display screen.

In the implementations of the present disclosure, the time for establishing the preloading Stack is not limited. The preloading Stack can be set to be resident by default before the terminal is shipped, that is, the preloading stack always exists. The preloading Stack can also be established after the terminal is turned on or unlocked. Alternatively, the preloading Stack can be established after an event of application preloading is triggered (before the target applications are determined), and the like. As an implementation, the application interfaces of the target applications are preloaded based on the pre-established preloading active-window stack as follows. Whether the pre-established preloading active-window stack exists is determined. When the pre-established preloading active-window stack is absent, a preloading active-window stack is established according to a preset principle. The application interfaces of the target applications are preloaded according to the preloading active-window stack established. In this way, whether the preloading Stack exists is determined after the target applications to-be-preloaded are determined. If so, it is unnecessary to establish a new stack, and if not, the preloading Stack is established, so that system resources can be saved. As an implementation, when there are multiple target applications, that is, when multiple applications need to be preloaded continuously in a short time period, since the preloading stack is established before a first target application starts to be preloaded, the preloading stack still exists before a second target application starts to be preloaded, and it is not necessary to determine as above before the second target application starts to be preloaded.

In the implementations of the present disclosure, the process for preloading the application interfaces of the target applications based on the preloading Stack is not limited. For example, the application interface can be drawn and displayed according to a size of the preloading Stack.

In some implementations, the application interfaces of the target applications are preloaded based on the pre-established preloading active-window stack as follows. A target process for the target applications is established. A task stack for the target applications is established in the pre-established preloading active-window stack. An active-window for the target applications is launched in the task stack according to the target process. The application interfaces of the target applications are drawn and displayed according to the active-window launched. As such, it is possible to draw and display the application interfaces of the target applications according to the preloading active-window stack that is located beyond the coordinate range of the display screen, without interfering with running and display of the foreground application, so as to ensure system stability and meanwhile effectively increase the speed of launching the target applications. While the target process is established, an initiation procedure of the target process can be included. During execution of the foregoing operations, preloading of other resources may also be involved, such as launching of application service, memory allocation, file content reading, network data acquisition, and the like. Preloading procedures of other resources are not limited in the implementations of the present disclosure.

In some implementations, the method further includes the following while preloading the N target applications. It is determined whether a launching operation for a predetermined code path of the second application is monitored. Suspend preloading of the N target applications, in response to determining that the launching operation for the preset code path is monitored. As such, during preloading of applications to be launched, smoothness of the application currently running can be effectively ensured, to enable the application currently running to be used normally, thus satisfying user needs.

In the implementations of the disclosure, while preloading N target applications, it is determined whether a launching operation for a predetermined code path of an application currently running is monitored. If yes, suspend preloading of the N target applications. During preloading of the N target applications, the second application currently running may still be in use by the user with some related functions enabled. The predetermined code path can include a code path which needs to be accessed from when an application is to be launched to when the application is completely launched. As an implementation, the second application currently running is Application D, and Function a of Application D needs to be enabled by the user. In this case, Code Path a1 corresponding to Function a needs to be accessed and launched. If the predetermined code path of Application D includes Code Path a1, Code Path b1, and Code Path c1, it indicates that the launching operation for the predetermined code path of the application currently running is monitored, and accordingly preloading of the N target applications is suspended for fear that preloading of the target applications should affect normal use of the application currently running. As an implementation, in response to monitoring that the launching operation for the predetermined code path of the second application is completed, restore preloading of the N target applications. As an implementation, in response to detecting that a time point at which Function a is triggered and enabled by the user is t1 (that is, a time point at which Code Path a1 is triggered and launched is t1) and detecting that a time point at which Code Path a1 is completely loaded is t2, preloading of the N target applications is suspended within time period t1 to t2. As an implementation, Application A is being preloaded at time point t1, and then preloading of Application A is suspended within time period t1 to t2. After time point t2, preloading of Application A will be restored, and other target applications that are not yet preloaded will be preloaded.

In some implementations, the N target applications are preloaded as follows. Central processing unit (CPU) utilization of the terminal is acquired. When the CPU utilization is smaller than a preset utilization threshold, the N target applications are preloaded. As another implementation, remaining storage capacity of the terminal is acquired. When the remaining storage capacity is greater than a preset storage threshold, the N target applications are preloaded. In this way, without affecting normal use of the application currently running, applications to be launched are preloaded, thereby satisfying user needs.

The CPU utilization refers to the percentage of total resources of CPU occupied by all applications currently running in the terminal. The higher CPU utilization, the more resources of CPU occupied by all applications currently running in the terminal, the slower the response of the terminal. On the contrary, the lower CPU utilization, the fewer resources of CPU occupied by all applications currently running in the terminal, the quicker the response of the terminal. When the CPU utilization of the terminal is lower than the preset utilization threshold, it indicates that more CPU resources of the terminal device are available, and preloading of the target applications will not affect normal use of the application currently running, nor will it affect the processing speed of the terminal. Therefore, when the CPU utilization of the terminal is lower than the preset utilization threshold, the N target applications are preloaded.

The remaining storage capacity reflects the amount of storage space available in the terminal. A greater remaining storage capacity indicates more storage space available in the terminal. On the contrary, a smaller remaining storage capacity indicates less storage space available in the terminal. When the remaining storage capacity of the terminal is greater than the preset storage threshold, it indicates that much storage space in the terminal is available, and preloading of the target applications will not affect normal use of the application currently running, nor will it affect the processing speed of the terminal. Therefore, when the remaining storage capacity of the terminal is greater than the preset storage threshold, the N target applications are preloaded.

In some implementations, the N target applications are preloaded as follows. The N target applications are recorded in a list of applications to be preloaded. Each of the target applications in the list of applications to be preloaded is preloaded sequentially at an interval of a preset time period for preloading until all the N target applications are completely loaded. In this way, stuttering of the terminal due to preloading of the target applications can be avoided.

In the implementations of the disclosure, preloading of multiple target applications at the same time is equivalent to launching the multiple target applications at the same time, which will easily result in stuttering of the terminal, thus affect use of the application currently running, and bring about a poor user experience. Therefore, when the multiple target applications are included, that is, N is an integer greater than or equal than two, time points for preloading of the N target applications are made staggered (that is, different) through an effective strategy for preloading. As an implementation, N equals 5, that is, there are five target applications to be launched, which are respectively Application A, Application B, Application C, Application D, and Application E. The above five applications are added to the list of applications to be preloaded, that is, Application A, Application B, Application C, Application D, and Application E compose the list of applications to be preloaded. As an implementation, the target applications in the list of applications to be preloaded are arranged in a descending order of launching probabilities. Each of the target applications in the list of applications to be preloaded is preloaded at intervals of the preset time period for preloading. As an implementation, the above five applications are arranged in a descending order of launching probabilities as follows: Application C, Application B, Application A, Application E, and Application D. Since launching of an application usually takes 2 s to 6 s (seconds) and does not exceed 10 s in general, the preset time period for preloading can be set to 10 s. As such, Application C is first preloaded, then Application B is preloaded after 10 s, thereafter Application A is preloaded the $10^{th}$ second after Application B is preloaded, and so on until all the target applications are completely loaded. While preloading the N target applications, in response to a launching operation on an application, suspend preloading of the target applications, take the application which was last launched as the application currently running, and predict once again target applications to be launched.

Figure 3:
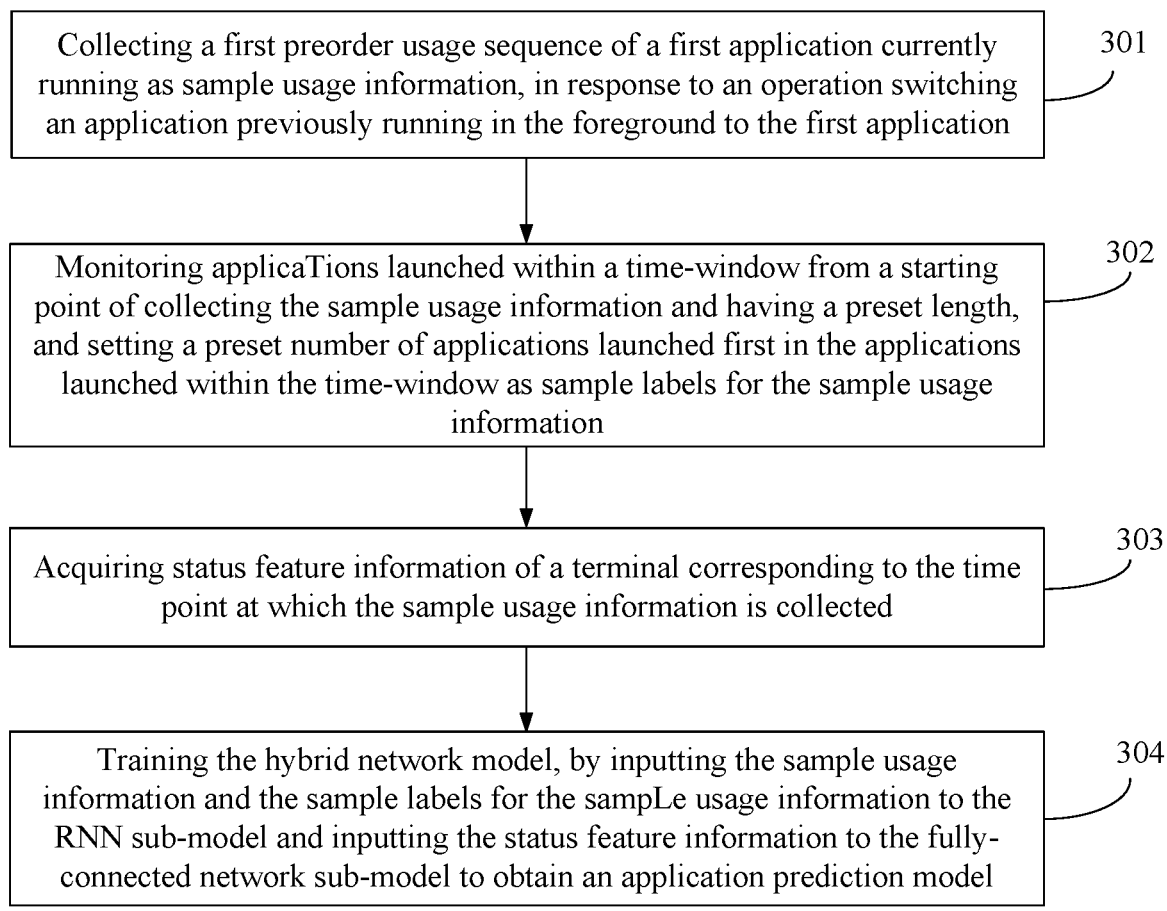
FIG. 3 is a flowchart illustrating a method for establishing an application prediction model according to another implementation of the present disclosure.

FIG. 3 is a flowchart illustrating another method for establishing an application prediction model according to another implementation of the present disclosure. The method includes the following. Specifically, operations corresponding to FIG. 3 illustrate how to establish an application prediction model according to sample usage information, sample label for the sample usage information, and information on status of a terminal.

At 301, a first preorder usage sequence of a first application currently running is collected as sample usage information, in response to an operation switching an application previously running in the foreground to the first application.

At 302, applications launched within a time-window with a preset length from a time point at which the sample usage information is collected as a start time point are monitored, and a launching sequence of a preset number of applications launched first in the applications launched within the time-window is set as a sample label for the sample usage information.

At 303, status feature information of a terminal corresponding to the time point at which the sample usage information is collected is acquired.

As an implementation, the status feature information includes at least one of: time information, a date category, an on/off status of a mobile data network, a connected/disconnected status of a wireless hotspot, identity information of a connected wireless hotspot, a duration for which a current application stays in the background, a time point at which the current application was last switched to the background, a plugging/unplugging status of an earphone jack, a charging status, power information of a battery, a display duration of a screen, and motion status and location information of the terminal.

The order in which the operation at 302 and the operation at 303 are performed is not limited herein. The operation at 302 may be performed first and then followed by the operation at 303, or the operation at 303 may be performed first and then followed by the operation at 302, or the operation at 302 and the operation at 303 may be performed simultaneously.

At 304, the hybrid network model is trained by inputting the sample usage information and the sample label for the sample usage information to the RNN sub-model and inputting the status feature information to the fully-connected network sub-model, to obtain the application prediction model.

In other words, the application prediction model is obtained, by training the hybrid network model by inputting the sample usage information and the sample label for the sample usage information to the RNN sub-model and inputting the status feature information to the fully-connected network sub-model.

According to the method for establishing an application prediction model provided herein, the application prediction model can be generated by training the hybrid network model built by the RNN sub-model and the fully-connected network sub-model based on usage regularity of applications corresponding to the information on historical status feature of the terminal, which is possible to further optimize mechanisms for application preloading and improve accuracy of predicting applications to be launched.

Figure 4:
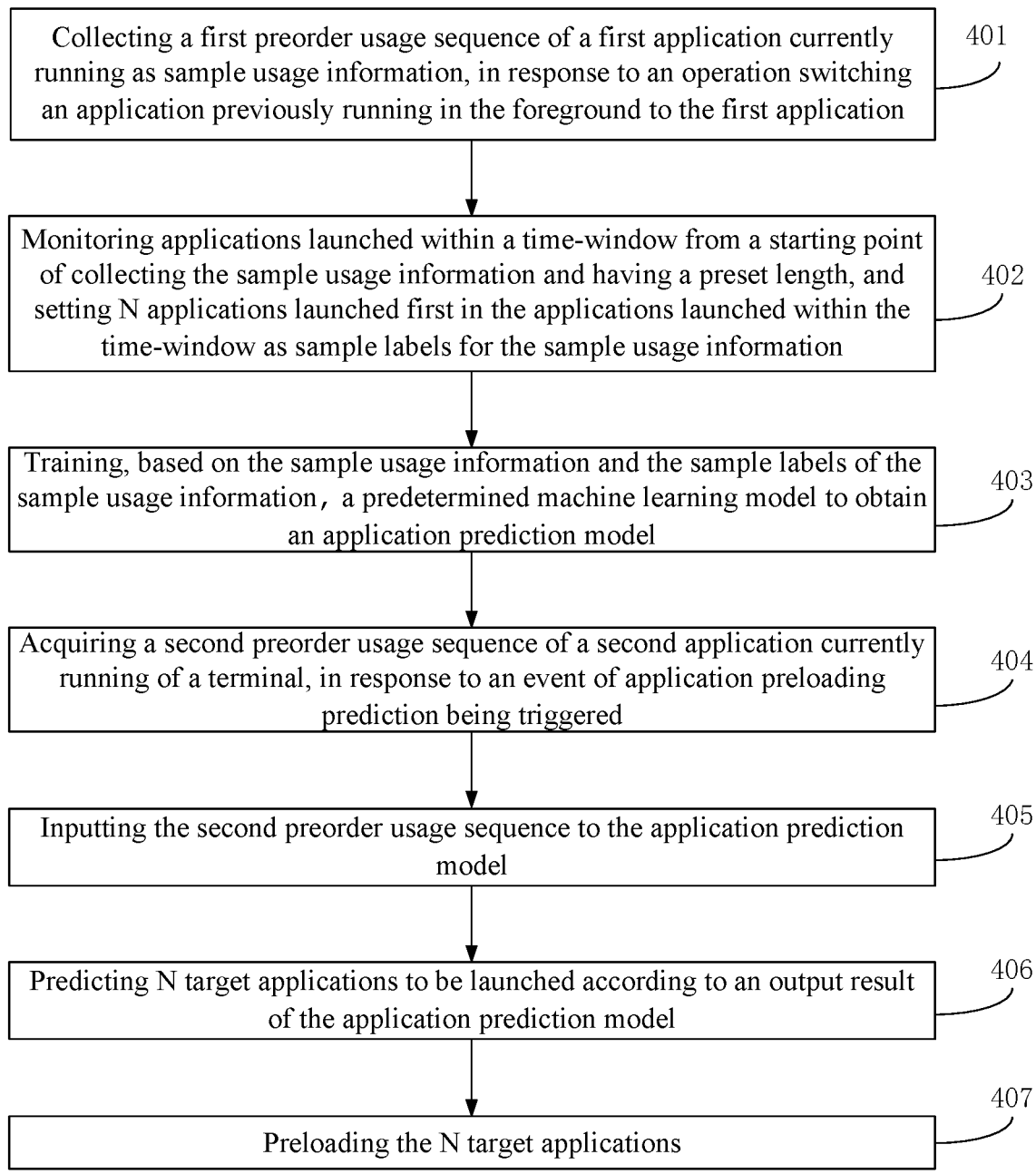
FIG. 4 is a flowchart illustrating a method for establishing an application prediction model according to yet another implementation of the present disclosure.

FIG. 4 is a flowchart illustrating a method for establishing an application prediction model according to yet another implementation of the present disclosure. The method includes the following. Specifically, operations corresponding to FIG. 4 illustrate how to establish an application prediction model and how to predict applications to be launched according to the application prediction model.

At 401, a first preorder usage sequence of a first application currently running is collected as sample usage information, in response to an operation switching an application previously running in the foreground to the first application.

At 402, applications launched within a time-window with a preset length from a time point at which the sample usage information is collected as a start time point are monitored, and N applications launched first in the applications launched within the time-window are set as sample labels for the sample usage information.

At 403, the predetermined machine learning model is trained based on the sample usage information and the sample labels for the sample usage information, to obtain the application prediction model.

At 404, a second preorder usage sequence of a second application currently running of a terminal is acquired, in response to an event of application preloading prediction being triggered.

At 405, the second preorder usage sequence is input to the application prediction model.

At 406, N target applications to be launched are predicted according to an output result of the application prediction model.

At 407, the N target applications are preloaded.

According to the method for establishing an application prediction model, the speed of generating the application prediction model can be effectively increased, accuracy of the application prediction model can be improved, and accuracy of predicting applications to be launched can be improved when the applications to be launched are predicted.

Figure 5:
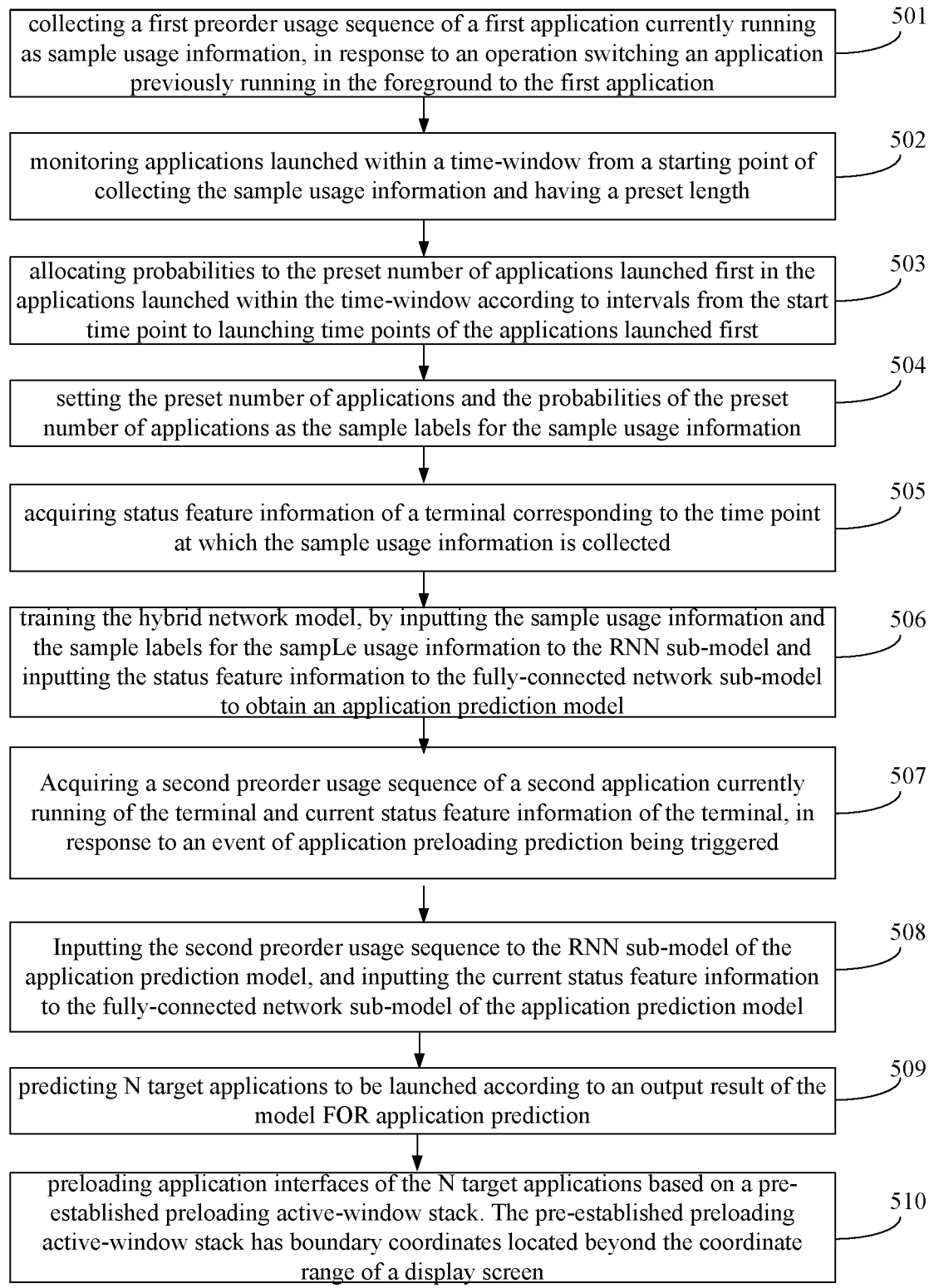
FIG. 5 is a flowchart illustrating a method for establishing an application prediction model according to still another implementation of the present disclosure.

FIG. 5 is a flowchart illustrating a method for establishing an application prediction model according to still another implementation of the present disclosure. The method includes the following. Specifically, operations corresponding to FIG. 5 illustrate how to establish an application prediction model and how to predict applications to be launched according to the application prediction model.

At 501, a first preorder usage sequence of a first application currently running as sample usage information is collected, in response to an operation switching an application previously running in the foreground to the first application.

At 502, applications launched within a time-window with a preset length from a time point at which the sample usage information is collected as a start time point are monitored.

At 503, probabilities are allocated to N applications launched first in the applications launched within the time-window according to intervals from the start time point to launching time points of the N applications launched first.

At 504, the N applications and the probabilities of the N applications are set as the sample labels for the sample usage information.

At 505, status feature information of a terminal corresponding to the time point at which the sample usage information is collected is acquired.

As an implementation, the status feature information includes at least one of: time information, a date category, an on/off status of a mobile data network, a connected/disconnected status of a wireless hotspot, identity information of a connected wireless hotspot, a duration for which a current application stays in the background, a time point at which the current application was last switched to the background, a plugging/unplugging status of an earphone jack, a charging status, power information of a battery, a display duration of a screen, and motion status and location information of the terminal.

At 506, the hybrid network model is trained by inputting the sample usage information and the sample labels for the sample usage information to the RNN sub-model and inputting the status feature information to the fully-connected network sub-model, to obtain the application prediction model.

At 507, a second preorder usage sequence of a second application currently running of the terminal and current status feature information (in other words, information on current status feature) of the terminal are acquired, in response to an event of application preloading prediction being triggered. The current status feature information of the terminal corresponds to a time point at which the second preorder usage sequence is acquired.

At 508, the second preorder usage sequence is input to the RNN sub-model of the application prediction model, and the current status feature information is input to the fully-connected network sub-model of the application prediction model.

At 509, N target applications to be launched are predicted according to an output result of the application prediction model.

At 510, application interfaces of the N target applications are preloaded based on a pre-established preloading active-window stack. The pre-established preloading active-window stack has boundary coordinates located beyond the coordinate range of a display screen.

According to the method for establishing an application prediction model provided herein, during establishment of the application prediction model, not only can the applications launched within the time-window with the preset length from the time point at which the sample usage information is collected as the start time point be determined, but also the intervals from the start time point to the launching time points of the applications launched can be determined, which is possible to further improve accuracy of establishing the application prediction model. In addition, application interfaces of applications to be preloaded can be preloaded based on a preloading active-window stack established outside the display screen. Such a manner of preloading can make preparation for launching of applications to a great extent, which increases launching speed of applications without interfering with content displayed on the display screen of the application running in the foreground.

Figure 6:
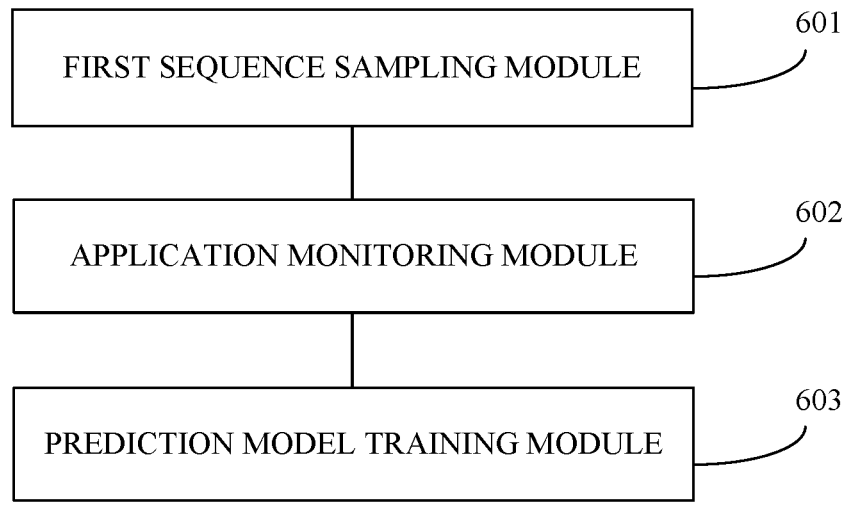
FIG. 6 is a block diagram illustrating an apparatus for establishing an application prediction model according to an implementation of the present disclosure.

FIG. 6 is a block diagram illustrating an apparatus for establishing an application prediction model according to an implementation of the present disclosure. The apparatus can be implemented in software and/or hardware and is usually integrated into a terminal. The application prediction model can be obtained by the apparatus for establishing an application prediction model by performing the method for establishing an application prediction model. As illustrated in FIG. 6, the apparatus includes a first sequence sampling module 601, an application monitoring module 602, and a prediction model training module 603.

The first sequence sampling module 601 is configured to collect a first preorder usage sequence of a first application currently running as sample usage information, in response to an operation switching an application previously running in the foreground to the first application.

The application monitoring module 602 is configured to monitor applications launched within a time-window with a preset length from a time point at which the sample usage information is collected as a start time point, and set a preset number of applications launched first in the applications launched within the time-window as sample labels for the sample usage information.

The prediction model training module 603 is configured to train a predetermined machine learning model based on the sample usage information and the sample labels for the sample usage information to obtain the application prediction model.

With aid of the apparatus for establishing an application prediction model provided herein, the first preorder usage sequence of the first application currently running is collected as the sample usage information, in response to the operation switching the application previously running in the foreground to the first application. The applications launched within the time-window with the preset length from the time point at which the sample usage information is collected as the start time point are monitored, and the preset number of applications launched first in the applications launched within the time-window are set as the sample labels for the sample usage information. Then the predetermined machine learning model is trained based on the sample usage information and the sample labels for the sample usage information to obtain the application prediction model. By adopting the above technical solution, speed of generating the application prediction model is effectively increased, and accuracy of the application prediction model is effectively improved, thereby improving accuracy of predicting applications to be launched.

In some implementations, the application monitoring module 602 configured to take the preset number of applications launched first in the applications launched within the time-window as the sample labels for the sample usage information is configured to set a launching sequence of the preset number of applications launched first in the applications launched within the time-window as the sample label for the sample usage information.

In some implementations, the application monitoring module 602 configured to take the preset number of applications launched first in the applications launched within the time-window as the sample labels for the sample usage information is configured to allocate probabilities to the preset number of applications launched first in the applications launched within the time-window according to intervals from the start time point to launching time points of the applications launched first, and set the preset number of applications and the probabilities of the preset number of applications as the sample labels for the sample usage information.

In some implementations, the apparatus further includes a feature information acquiring module. The feature information acquiring module is configured to acquire status feature information of a terminal corresponding to the time point at which the sample usage information is collected before training the predetermined machine learning model based on the sample usage information and the sample labels for the sample usage information.

The prediction model training module further includes a prediction model training unit. The prediction model training unit is configured to train the predetermined machine learning model based on the status feature information, the sample usage information, and the sample labels for the sample usage information.

In some implementations, the predetermined machine learning model is a hybrid network model. The hybrid network model includes an RNN sub-model and a fully-connected network sub-model built based on a fully connected layer, and an output layer of the RNN sub-model and an output layer of the fully-connected network sub-model build the hybrid network model based on a full connection relationship.

The prediction model training unit is configured to train the hybrid network model, by inputting the sample usage information and the sample labels for the sample usage information to the RNN sub-model and inputting the status feature information to the fully-connected network sub-model.

In some implementations, the status feature information includes at least one of: time information, a date category, an on/off status of a mobile data network, a connected/disconnected status of a wireless hotspot, identity information of a connected wireless hotspot, a duration for which a current application stays in the background, a time point at which the current application was last switched to the background, a plugging/unplugging status of an earphone jack, a charging status, power information of a battery, a display duration of a screen, and motion status and location information of the terminal.

In some implementations, the apparatus further includes a second sequence acquiring module, a second sequence inputting module, an application predicting module, and an application preloading module.

The second sequence acquiring module is configured to acquire a second preorder usage sequence of a second application currently running of a terminal, in response to an event of application preloading prediction being triggered, after the application prediction model is obtained, where the preset number is N.

The second sequence inputting module is configured to input the second preorder usage sequence to the application prediction model.

The application predicting module is configured to predict N target applications to be launched according to an output result of the application prediction model. The application preloading module is configured to preload the N target applications.

In some implementations, the application preloading module is configured to preload application interfaces of the N target applications based on a pre-established preloading active-window stack. The pre-established preloading active-window stack has boundary coordinates located beyond the coordinate range of a display screen.

In some implementations, during preloading the N target applications, whether a launching operation for a predetermined code path of the second application is monitored is determined. Preloading of the N target applications is suspended, in response to determining that the launching operation for the preset code path is monitored.

In the implementations of the present disclosure, the units or sub-units can refer an application-specific integrated circuit (ASIC), a processor, a memory configured to implement one or more software or hardware programs, a integrated logical circuit, and/or other devices that can provide above functions. In addition, the above units or sub-units can be implemented via the processor of terminal device illustrated in FIG. 7.

A non-transitory storage medium including computer executable instructions is further provided in implementations of the disclosure. The computer executable instructions are configured to execute the method for establishing an application prediction model when executed by a processor. The method includes the following.

A first preorder usage sequence of a first application currently running is collected as sample usage information, in response to an operation switching an application previously running in the foreground to the first application. Applications launched within a time-window with a preset length from a time point at which the sample usage information is collected as a start time point are monitored, and a preset number of applications launched first in the applications launched within the time-window are set as sample labels for the sample usage information. A predetermined machine learning model is obtained based on the sample usage information and the sample labels for the sample usage information to obtain the application prediction model.

The storage medium refers to any of various types of memory devices or storage devices. The term "storage medium" is intended to include: a mounting medium such as a compact disc read-only memory (CD-ROM), a floppy disk, or a tape device; a computer system memory or a random access memory such as a dynamic random access memory (DRAM), a double data rate random access memory (DDRRAM), a static random access memory (SRAM), an extended data output random access memory (EDORAM) and a Rambus random access memory (Rambus RAM); a non-transitory memory such as a flash memory and a magnetic medium (such as a hard disk or an optical memory); a register and other similar types of memory elements, and the like. The storage medium can also include other types of memory or a combination thereof. In addition, the storage medium can be located in a first computer system in which a program is executed, or can be located in a second computer system coupled to the first computer system via a network, such as the Internet. The second computer system can provide program instructions to the first computer for execution. The term "storage medium" can include two or more storage media that can reside in different locations (e.g. different computer systems connected through a network). The storage medium can store program instructions which are, for example, implemented as computer programs and are executable by one or more processors.

The computer executable instructions included in the storage medium provided herein are not limited to executing the operations of establishing an application prediction model as described above, and can also execute relevant operations of the method for establishing an application prediction model according to any of the implementations of the disclosure.

Figure 7:
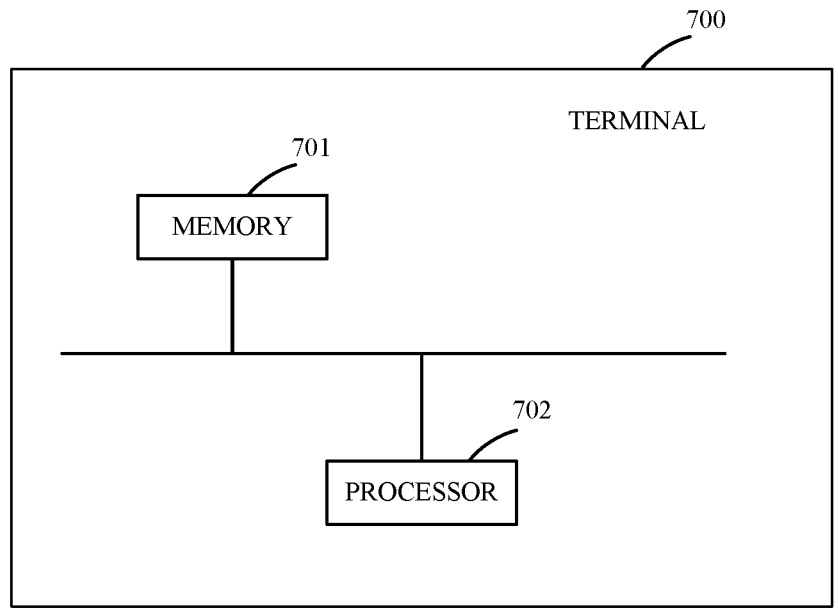
FIG. 7 is a block diagram illustrating a terminal according to an implementation of the present disclosure.

A terminal is provided in implementations of the disclosure, into which the apparatus for establishing an application prediction model of the implementations of the disclosure can be integrated. FIG. 7 is a block diagram illustrating a terminal according to an implementation of the present disclosure. The terminal 700 includes memory 701, a processor 702, and computer programs which are stored in the memory and capable of running on the processor. The computer programs are configured to execute the method for establishing an application prediction model when executed by the processor 702.

With aid of the terminal provided herein, speed of generating the application prediction model can be increased, and accuracy of the application prediction model can be improved, thereby improving accuracy of predicting applications to be launched.

Figure 8:
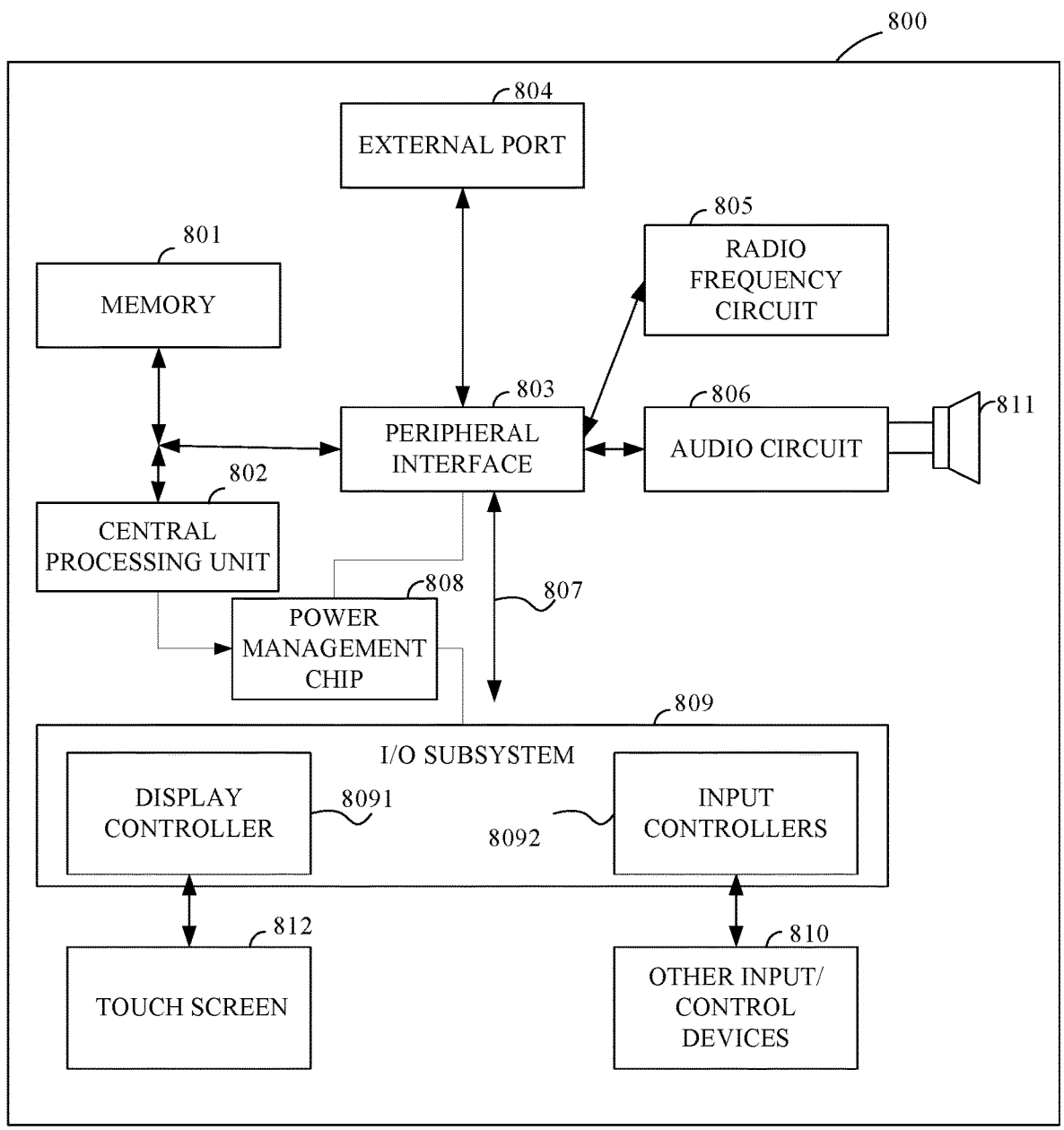
FIG. 8 is a block diagram illustrating a terminal according to another implementation of the present disclosure.

FIG. 8 is a block diagram illustrating another terminal according to an implementation of the present disclosure. The terminal includes a housing (not illustrated), a memory 801, and a central processing unit (CPU) 802 (also referred to as a processor, hereinafter "CPU" for short), a circuit board (not illustrated), and a power supply circuit (not illustrated). The circuit board is disposed inside a space defined by the housing. The CPU 802 and the memory 801 are disposed on the circuit board. The power supply circuit is configured to supply power to each circuit or component of the terminal. The memory 801 is configured to store executable program codes. The CPU 802 is configured to run a computer program corresponding to the executable program codes by reading the executable program codes stored in the memory 801 to carry out the following operations.

A first preorder usage sequence of a first application currently running is collected as sample usage information, in response to an operation switching an application previously running in the foreground to the first application. Applications launched within a time-window with a preset length from a time point at which the sample usage information is collected as a start time point are monitored, and a preset number of applications launched first in the applications launched within the time-window are set as sample labels for the sample usage information. A predetermined machine learning model is trained based on the sample usage information and the sample labels for the sample usage information to obtain the application prediction model.

The terminal further includes a peripheral interface 803, a radio frequency (RF) circuit 805, an audio circuit 806, a speaker 811, a power management chip 808, an input/output (I/O) subsystem 809, other input/control devices 810, a touch screen 812, other input/control devices 810, and an external port 804, which communicate with each other via one or more communication buses or signal lines 807.

It should be understood that, the terminal 800 illustrated is just exemplary and the terminal 800 can have more or fewer components than those illustrated in FIG. 8. For example, two or more components can be combined, or different component configurations can be adopted in the terminal. The various components illustrated in FIG. 8 can be implemented in hardware, software, or a combination thereof including one or more signal processing and/or application specific integrated circuits.

The following will describe in detail a mobile phone as an example of the terminal for establishing an application prediction model.

The memory 801 is accessible to the CPU 802, the peripheral interface 803, and so on. The memory 801 can include a high-speed random access memory and can further include a non-transitory memory such as one or more magnetic disk storage devices, flash memory devices, or other transitory solid-state memory devices.

The peripheral interface 803 is configured to connect the input and output peripherals of the device to the CPU 802 and the memory 801.

The I/O subsystem 809 is configured to connect the input and the output peripherals such as the touch screen 812 and other input/control devices 810 to the peripheral interface 803. The I/O subsystem 809 can include a display controller 8091 and one or more input controllers 8092 configured to control other input/control devices 810. The one or more input controllers 8092 are configured to receive electrical signals from or send electrical signals to other input/control devices 810, where other input/control devices 810 can include a physical button (a press button, a rocker button, etc.), a dial, a slide switch, a joystick, or a click wheel. It should be noted that the input controller 8092 can be coupled with any of a keyboard, an infrared port, a universal serial bus (USB) interface, and a pointing apparatus such as a mouse.

The touch screen 812 functions as an input interface and an output interface between a terminal and a user, and is configured to display a visual output to the user. The visual output can include graphics, text, icons, videos, and the like.

The display controller 8091 in the I/O subsystem 809 is configured to receive an electrical signal from or send an electrical signal to the touch screen 812. The touch screen 812 is configured to detect contact on the touch screen. The display controller 8091 is configured to convert the contact detected into an interaction with a user interface object displayed on the touch screen 812, that is, to realize human-computer interaction. The user interface object displayed on the touch screen 812 can be an icon of a running game, an icon indicating connection to corresponding networks, and the like. It should be noted that, the device can also include a light mouse, which is a touch-sensitive surface that does not display a visual output, or can be an extension of a touch-sensitive surface formed by the touch screen.

The RF circuit 805 is configured to establish communication between a mobile phone and a wireless network (i.e. network side), to transmit and receive data between the mobile phone and the wireless network, such as transmitting and receive short messages, emails, and the like. The RF circuit 805 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit 805 can include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM), and so on.

The audio circuit 806 is configured to receive audio data from the peripheral interface 803, to convert the audio data into an electrical signal, and to transmit the electrical signal to the speaker 811.

The speaker 811 is configured to restore the voice signal received by the mobile phone from the wireless network via the RF circuit 805 to sound and to play the sound to the user.

The power management chip 808 is configured for power supply and power management of the hardware connected to the CPU 802, the I/O subsystem 809, and the peripheral interfaces 803.

The apparatus for establishing an application prediction model, the storage medium, and the terminal of the above implementations can execute the method for establishing an application prediction model of any of the above implementations and have corresponding functional modules and advantages of executing the method. For technical details not described herein, reference can be made to the description of the method for establishing an application prediction model.

The above are only some implementations of the present disclosure and the technical principles applied thereto. Those skilled in the art will appreciate that the present disclosure is not limited to the implementations described herein, and that various changes, modifications, and substitutions can be made by those skilled in the art without departing from the scope of the disclosure. Therefore, while the disclosure has been described in connection with certain implementations, it is to be understood that the disclosure is not to be limited to the disclosed implementations but, on the contrary, is intended to cover various equivalent implementations included within the scope of the disclosure. The scope of the disclosure is determined by the scope of the appended claims.

What is claimed is:

1. A method for establishing an application prediction model, comprising:
   collecting a first preorder usage sequence of a first application currently running as sample usage information, in response to an operation switching an application previously running in the foreground to the first application;
   monitoring applications launched within a time-window from a starting point of collecting the sample usage information and having a preset length, and setting a preset number of applications launched first in the applications launched within the time-window as sample labels for the sample usage information; and
   training, based on the sample usage information and the sample labels for the sample usage information, a predetermined machine learning model to obtain an application prediction model,
   wherein setting the preset number of applications launched first in the applications launched within the time-window as the sample labels for the sample usage information comprises:
      allocating probabilities to the preset number of applications launched first in the applications launched within the time-window according to intervals from the start time point to launching time points of the applications launched first; and
      setting the preset number of applications and the probabilities of the preset number of applications as the sample labels for the sample usage information.

2. The method of claim 1, further comprising:
   acquiring status feature information of a terminal corresponding to a time point at which the sample usage information is collected,
   wherein training the predetermined machine learning model based on the sample usage information and the sample labels for the sample usage information comprises:
   training the predetermined machine learning model based on the status feature information, the sample usage information, and the sample labels for the sample usage information.

3. The method of claim 1, wherein the preset number is N, and the method further comprises:
   acquiring a second preorder usage sequence of a second application currently running of a terminal, in response to an event of application preloading prediction being triggered;
   inputting the second preorder usage sequence to the application prediction model;
   predicting N target applications to be launched according to an output result of the application prediction model; and
   preloading the N target applications.

4. The method of claim 2, wherein the predetermined machine learning model is a hybrid network model, the hybrid network model comprises a recurrent neural network (RNN) sub-model and a fully-connected network sub-model built based on a fully connected layer, and an output layer of the RNN sub-model and an output layer of the fully-connected network sub-model build the hybrid network model based on a full connection relationship; and
   wherein training the predetermined machine learning model based on the status feature information, the sample usage information, and the sample labels for the sample usage information comprises:
      training the hybrid network model, by inputting the sample usage information and the sample labels for the sample usage information to the RNN sub-model and inputting the status feature information to the fully-connected network sub-model.

5. The method of claim 2, wherein the status feature information comprises at least one of:
   time information, a date category, an on/off status of a mobile data network, a connected/disconnected status of a wireless hotspot, identity information of a connected wireless hotspot, a duration for which a current application stays in the background, a time point at which the current application was last switched to the background, a plugging/unplugging status of an earphone jack, a charging status, power information of a battery, a display duration of a screen, and motion status and location information of the terminal.

6. The method of claim 3, wherein preloading the N target applications comprises:
   preloading application interfaces of the N target applications based on a pre-established preloading active-window stack, the pre-established preloading active-window stack having boundary coordinates located beyond the coordinate range of a display screen.

7. The method of claim 3, wherein preloading the N target applications comprises:
   recording the N target applications in a list of applications to be preloaded; and
   preloading each of the target applications in the list of applications to be preloaded sequentially at an interval of a preset time period for preloading until all the N target applications are completely loaded.

8. The method of claim 3, further comprising:
   determining whether a launching operation for a predetermined code path of the second application is monitored; and
   suspending preloading of the N target applications, in response to determining that the launching operation of the predetermined code path is monitored.

9. The method of claim 3, further comprising one of:
   acquiring central processing unit (CPU) utilization of the terminal; and determining that the CPU utilization is smaller than a preset utilization threshold; and acquiring remaining storage capacity of the terminal; and
determining that the remaining storage capacity is greater than a preset storage threshold.

10. A non-transitory computer-readable storage medium storing a computer program which, when executed by a processor, causes the processor to carry out actions, comprising:
collecting a first preorder usage sequence of a first application currently running as sample usage information, in response to an operation switching an application previously running in the foreground to the first application;
monitoring applications launched within a time-window from a starting point of collecting the sample usage information and having a preset length and setting a preset number of applications launched first in the applications launched within a time-window as sample labels for the sample usage information; and
training a predetermined machine learning model based on the sample usage information and the sample labels for the sample usage information to obtain an application prediction model,
wherein setting the preset number of applications launched first in the applications launched within the time-window as the sample labels for the sample usage information is executed by the processor to carry out actions comprises:
allocating probabilities to the preset number of applications launched first in the applications launched within the time-window according to intervals from the start time point to launching time points of the applications launched first; and
setting the preset number of applications and the probabilities of the preset number of applications as the sample labels for the sample usage information.

11. The non-transitory computer-readable storage medium of claim 10, wherein the computer program is further executed by the processor to carry out actions, comprising:
acquiring status feature information of a terminal corresponding to a time point at which the sample usage information is collected,
wherein the computer program executed by the processor to carry out the action of training the predetermined machine learning model based on the sample usage information and the sample labels for the sample usage information is executed by the processor to carry out actions, comprising:
training the predetermined machine learning model based on the status feature information, the sample usage information, and the sample labels for the sample usage information.

12. The non-transitory computer-readable storage medium of claim 10, wherein the computer program is further executed by the processor to carry out actions, comprising:

acquiring a second preorder usage sequence of a second application currently running of a terminal, in response to an event of application preloading prediction being triggered;
inputting the second preorder usage sequence to the application prediction model;
predicting N target applications to be launched according to an output result of the application prediction model; and
preloading the N target applications.

13. A terminal, comprising:
at least one processor; and
a computer readable storage, coupled to the at least one processor and storing at least one computer executable instruction thereon which, when executed by the at least one processor, cause the at least one processor to carry out actions, comprising:
collecting a first preorder usage sequence of a first application currently running as sample usage information, in response to an operation switching an application previously running in the foreground to the first application;
monitoring applications launched within a time-window from a starting point of collecting the sample usage information and having a preset length and setting a preset number of applications launched first in the applications launched within a time-window as sample labels for the sample usage information; and
training a predetermined machine learning model based on the sample usage information and the sample labels for the sample usage information to obtain an application prediction model,
wherein setting the preset number of applications launched first in the applications launched within the time-window as the sample labels for the sample usage information is caused to carry out actions comprises:
allocating probabilities to the preset number of applications launched first in the applications launched within the time-window according to intervals from the start time point to launching time points of the applications launched first; and
setting the preset number of applications and the probabilities of the preset number of applications as the sample labels for the sample usage information.

14. The terminal of claim 13, wherein the at least one processor is further caused to carry out actions, comprising:
acquiring a second preorder usage sequence of a second application currently running of a terminal, in response to an event of application preloading prediction being triggered;
inputting the second preorder usage sequence to the application prediction model;
predicting N target applications to be launched according to an output result of the application prediction model; and
preloading the N target applications.

* * * * *